US007130973B1

(12) United States Patent
Chong, Jr. et al.

(10) Patent No.: US 7,130,973 B1
(45) Date of Patent: *Oct. 31, 2006

(54) METHOD AND APPARATUS TO RESTORE DATA REDUNDANCY AND UTILIZE SPARE STORAGE SPACES

(75) Inventors: Fay Chong, Jr., Cupertino, CA (US); Whay S. Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 10/637,416

(22) Filed: Aug. 8, 2003

(51) Int. Cl.
*G06F 12/16* (2006.01)
(52) U.S. Cl. .............................. 711/162; 714/5; 714/6; 714/7; 714/8; 711/114; 711/112
(58) Field of Classification Search ...................... None
See application file for complete search history.

(56) References Cited

U.S. PATENT DOCUMENTS 5,802,364 A * 9/1998 Senator et al. ............... 719/325
6,640,278 B1 * 10/2003 Nolan et al. ..................... 711/6

OTHER PUBLICATIONS

David Stott, "Understanding RAID", *PC Network Advisor*, Issue 95, pp. 17-20, May 1998.

Garth Gibson, "Reliable, Parallel Storage Architecture: RAID and Beyond", *ISCA*, 1995.
IBM, "iSCSI Storage over IP: the potential behind the technology", 2001.
Storage Networking Industry Association, "Tutorial on Storage Virtualization", 2002.
Storage Networking Industry Association, "Technology Directions for Storage Networking".

* cited by examiner

*Primary Examiner*—B. James Peikari
(74) *Attorney, Agent, or Firm*—Dorsey & Whitney LLP

(57) ABSTRACT

Methods and apparatuses to restore data redundancy in a storage system with a storage virtualization engine. In one aspect of the invention, a method to restore data redundancy includes: receiving input indicating loss of redundancy for first data on a first storage unit; copying the first data from the first storage unit to a second storage unit so that the first data stored on the second storage unit has redundancy; and mapping (or configuring a storage virtualization engine to map) logical addresses for accessing the first data to physical addresses for the second storage unit in which the first data is stored. In one example according to this aspect, a portion of the second storage unit is determined and the first data is copied onto the portion of the second storage unit. The first and second storage units can be in a same storage subsystem under control of a storage controller or in different storage subsystems under control of separated storage controllers (e.g., disk controllers).

18 Claims, 7 Drawing Sheets

METHOD AND APPARATUS TO RESTORE DATA REDUNDANCY AND UTILIZE SPARE STORAGE SPACES

FIELD OF THE INVENTION

The invention relates to data redundancy, and more particularly to restoring data redundancy after a storage media failure in a redundant group.

RELATED APPLICATIONS

This application is related to U.S. patent application Ser. No. 10/637,330, filed Aug. 8, 2003, entitled "Method and Apparatus to Restore Data Redundancy" by inventors Fay Chong Jr. and Whay S. Lee.

BACKGROUND OF THE INVENTION

Due to the increased demands for data storage, a data center maintains a large number of disk drives (e.g., 500–1000 disks). Typically, these disks are not in one monolithic system. Instead, a large number of disk subsystems (e.g., 20 to 100 subsystems) are used to form a data center. A disk subsystem typically has one or more disk controllers, which directly control the disks within the subsystems. However, a disk controller in one subsystem cannot control a disk in another subsystem.

Disk arrays (e.g., Redundant Array of Inexpensive Drives (RAID)) are typically used to achieve faster data access and data redundancy. If one of the disk drives in a disk array dies or crashes, the data on the crashed disk drive can be recovered from the data stored on the remaining disk drive(s) in the disk array. Typically, a disk array can tolerate losing one disk drive. When one disk drive in the disk array fails, the data on the disk array loses redundancy; however, the disk array can still function properly (e.g., read and write data typically with degraded performance). A second failure can lead to data loss. To reduce the risk of data loss, the failed disk drive in the disk array is typically replaced as soon as possible to return the disk array to a normal operation mode with data redundancy.

Some systems have hot spares. A hot spare is a back-up drive in the array that automatically comes on-line in the event of a failure of one of the other drives. The data on the failed disk drive is automatically rebuilt (e.g., by a RAID controller) on the hot spare to restore data redundancy. Since a typical array can only tolerate a single drive failure without data loss, a hot spare drive reduces this window of opportunity for total failure. When the hot spare is used, the replacement of the failed disk drive can be scheduled at a convenient time. After the failed disk drive is replaced, the replacement drive becomes the new hot spare.

Thus, when a disk array (e.g., a RAID system) loses data redundancy in the event of a drive failure, the failed disk is replaced as soon as possible. If there is a hot spare under control of the disk controller in the subsystem, the subsystem can automatically use the hot spare to replace the failed drive; however, if no hot spare is available in the subsystem (e.g., when the hot spares are already depleted), a service person has to manually replace the failed drive with a new one.

SUMMARY OF THE DESCRIPTION

Methods and apparatuses to restore data redundancy in a storage system with a storage virtualization engine are described here.

In one aspect of the invention, a method to restore data redundancy includes: receiving input indicating loss of redundancy for first data on a first storage unit (e.g., a RAID array in a disk subsystem); copying the first data from the first storage unit to a second storage unit so that the first data stored on the second storage unit has redundancy; and mapping (or configuring a storage virtualization engine to map) logical addresses for accessing the first data to physical addresses for the second storage unit in which the first data is stored. In one example according to this aspect, an unused portion of the second storage unit is determined and the first data is copied onto the unused portion of the second storage unit. The first and second storage units can be in the same storage subsystem under control of a storage controller or in different storage subsystems under control of separated storage controllers (e.g., disk controllers). In another example, the first data copied to the second storage unit is only a portion of the data that loses redundancy on the first storage unit; and the input also indicates loss of redundancy for second data on the first storage unit. The second data is copied from the first storage unit to a third storage unit so that the second data stored on the third storage unit has redundancy. The logical addresses for accessing the second data are mapped to physical addresses for the third storage unit in which the second data is stored.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Many of the methods of the present invention may be performed with a digital processing system, such as a conventional, general purpose computer system. Special purpose devices which are designed or programmed to perform only one function may also be used.

Figure 1:
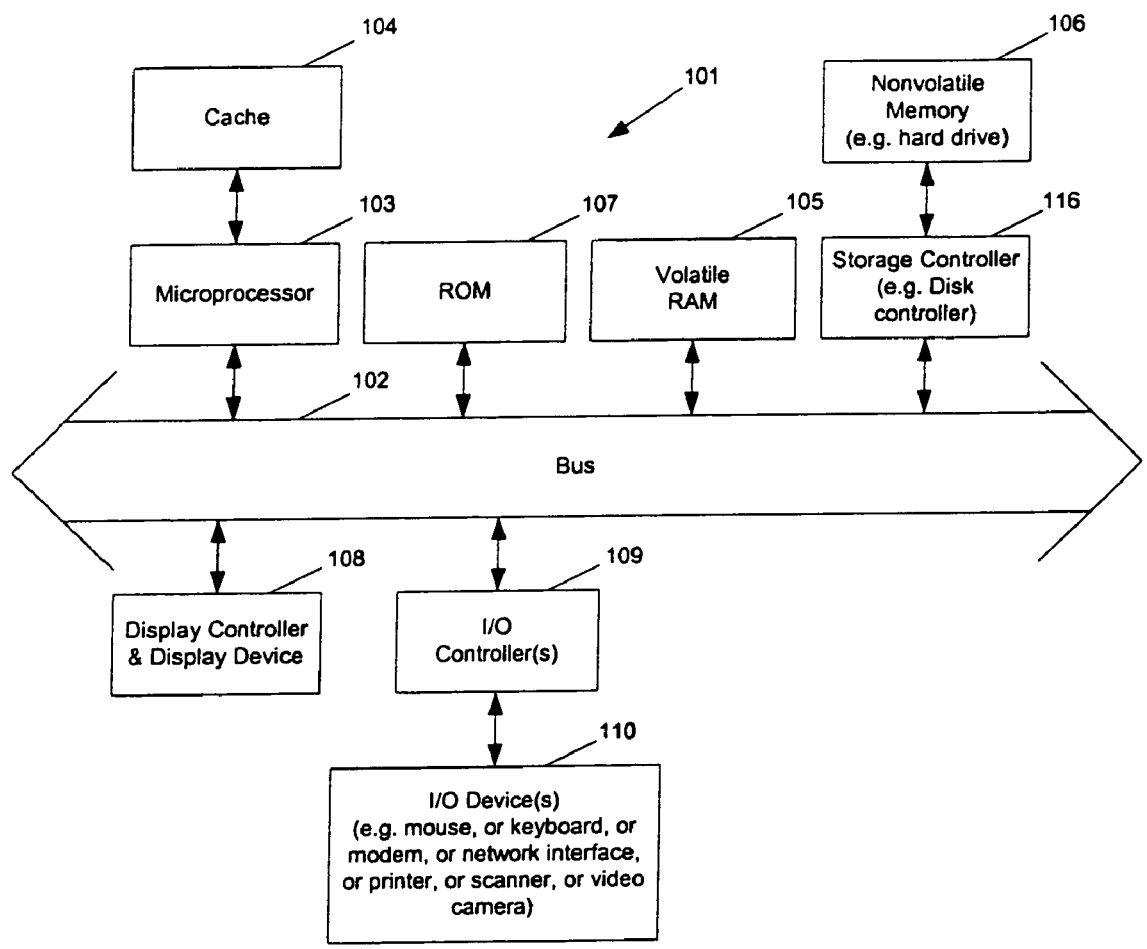
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103 is coupled to cache memory 104 as shown in the example of FIG. 1. The bus 102 interconnects these various components together and also interconnects these components 103, 107, 105, and 116 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Non-volatile memory 106 is typically connected to the system through storage controller 116 (e.g., a disk controller, or a memory interface). Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Typically, a hot spare in a disk subsystem can be used to replace a failed disk in that disk subsystem. However, a disk subsystem cannot use a hot spare in another disk subsystem. Thus, each disk subsystem may have its own hot spare, which cannot be used by other subsystems. When a data center has a large number of subsystems, a large number of spare disks are spread in the subsystems as hot spares, which can be used only within the corresponding subsystems. Higher availability would result if spare disks in the data center could be used to replace the drives in any of the subsystems affected by a failed drive.

Figure 2:
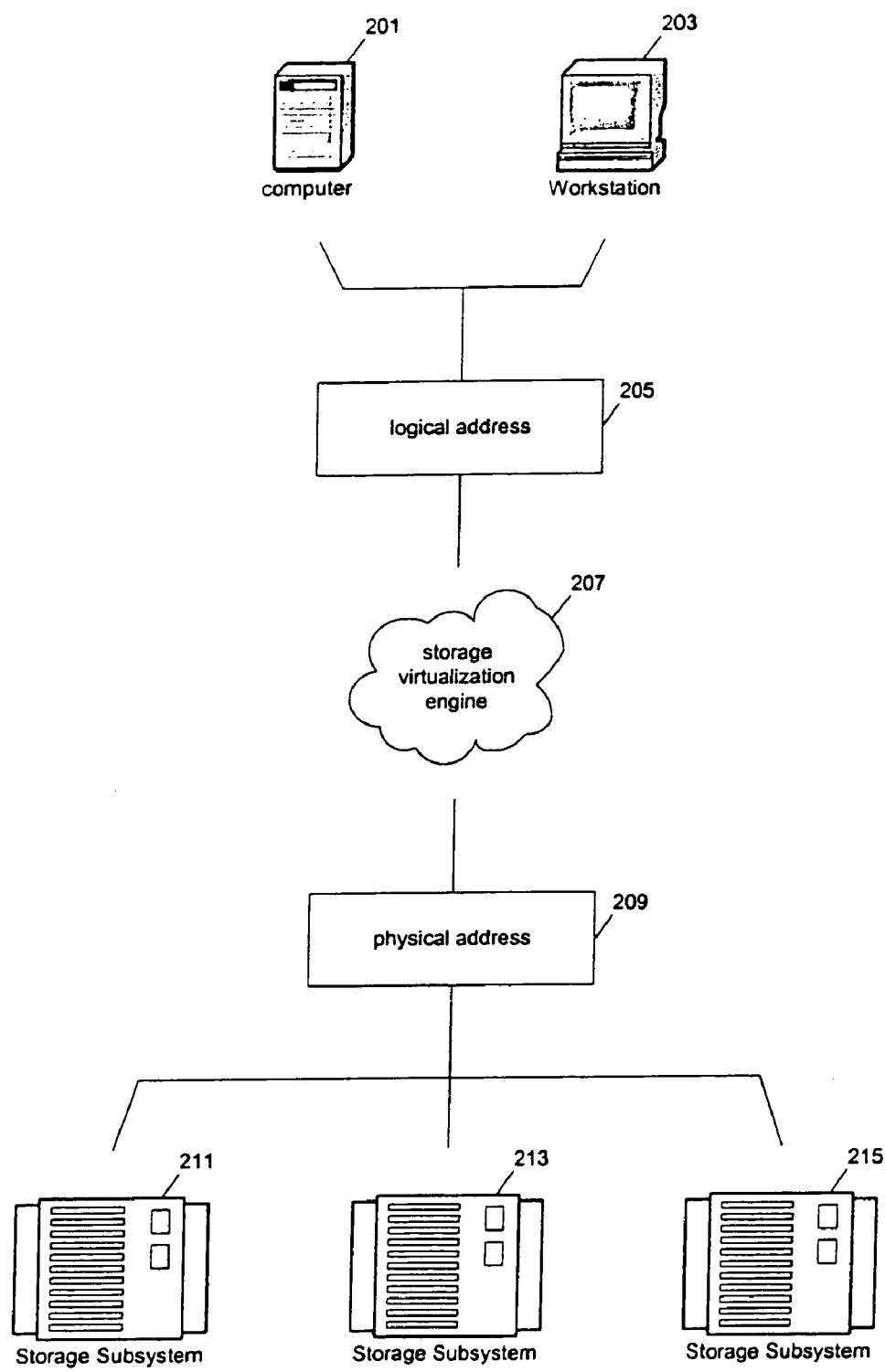
FIG. 2 shows a system with a storage virtualization engine in which methods according to various embodiments of the present invention can be used.

FIG. 2 shows a system with a storage virtualization engine in which methods according to various embodiments of the present invention can be used. Storage virtualization engine 207 maps logical addresses 205 for accessing virtual storage devices to physical addresses 209 for accessing real storage devices (e.g., storage subsystems 211–215). A storage virtualization engine can dynamically change the mapping so that the data processing units (e.g., 201 and 203) can access the data on the same virtual device, even if the data of the virtual device is physically moved from one storage device to another storage device. A storage virtualization engine may map the logical addresses for one virtual device to physical addresses of several real storage devices so that one part of the data on the virtual device is physically stored on one of the real storage devices and another part of the data on the virtual device is physically stored on another of the real storage devices. A storage virtualization engine can create a virtual device of a required size from one or more physical storage devices.

FIG. 2 illustrates an example connection scheme among data processing units and storage subsystems. However, FIG. 2 is not intended to represent any particular architecture or manner of interconnecting the storage subsystems and data processing units as such details are not germane to the present invention. For example, storage subsystems 211–215 may be connected to a data bus (e.g., a fibre channel or a SCSI bus), or a network media. The storage virtualization engine may be implemented using hardware and/or software. For example, the storage virtualization engine can be a special purpose device interfacing a data bus and storage subsystems. The special purpose device may have a hardwired circuitry for performing various methods of the present invention; or the special purpose device may have a processor and memory, which contains instructions for performing various methods of the present invention on the processor. Alternatively, a software program running as a part of the operating system of a server (e.g., processor 101 as shown in FIG. 1) can be used as the storage virtualization engine. In yet another alternative embodiment, the storage virtualization engine may be implemented within one of the storage subsystems. More or less storage subsystems and data processing units may be used in different embodiments. Methods of various embodiments of the present invention can be performed by the storage virtualization engine or by a processing unit connected to the storage virtualization engine.

A storage subsystem may have one or more storage units (redundant groups) under control of one or more storage controllers. It is understood that a storage unit is a group of independent storage media (e.g., hard drives, memory cells), which when operating in a normal mode provides redundancy for the data stored on the storage unit. When one of the storage media of the storage unit fails, the data on the failed storage media can be recovered from the data on the other storage media of the storage unit. Although various examples are described in connection with storage subsystem made of disk arrays (e.g., RAID of magnetic or optical storage media), the methods of various embodiments of the present invention can also be used with storage units of other storage media, such as memory cells, magnetic tape drives, and others.

Figure 3:
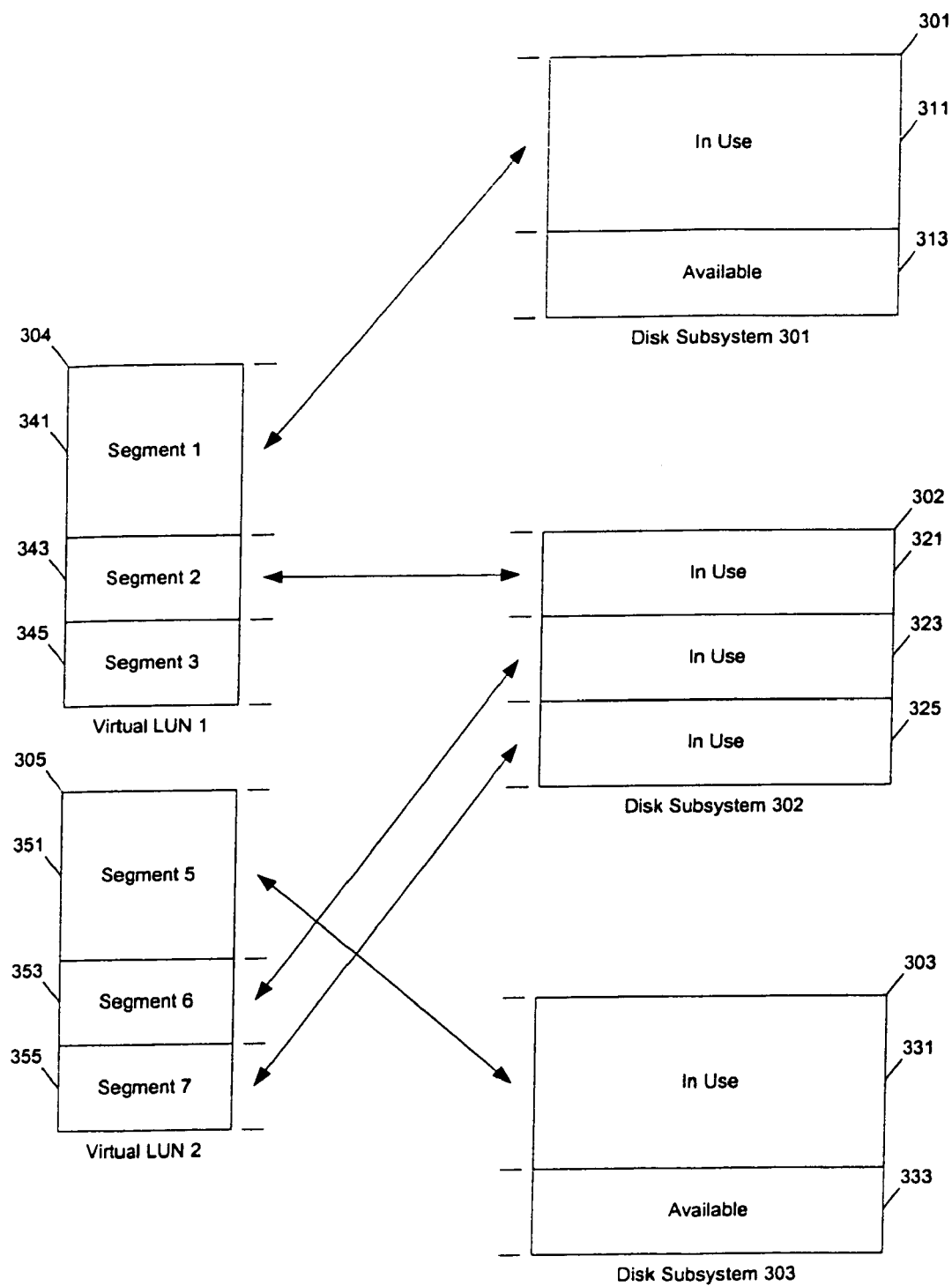
FIGS. 3–5 illustrate an example scenario to restore data redundancy according to one embodiment of the present invention.
Figure 4:
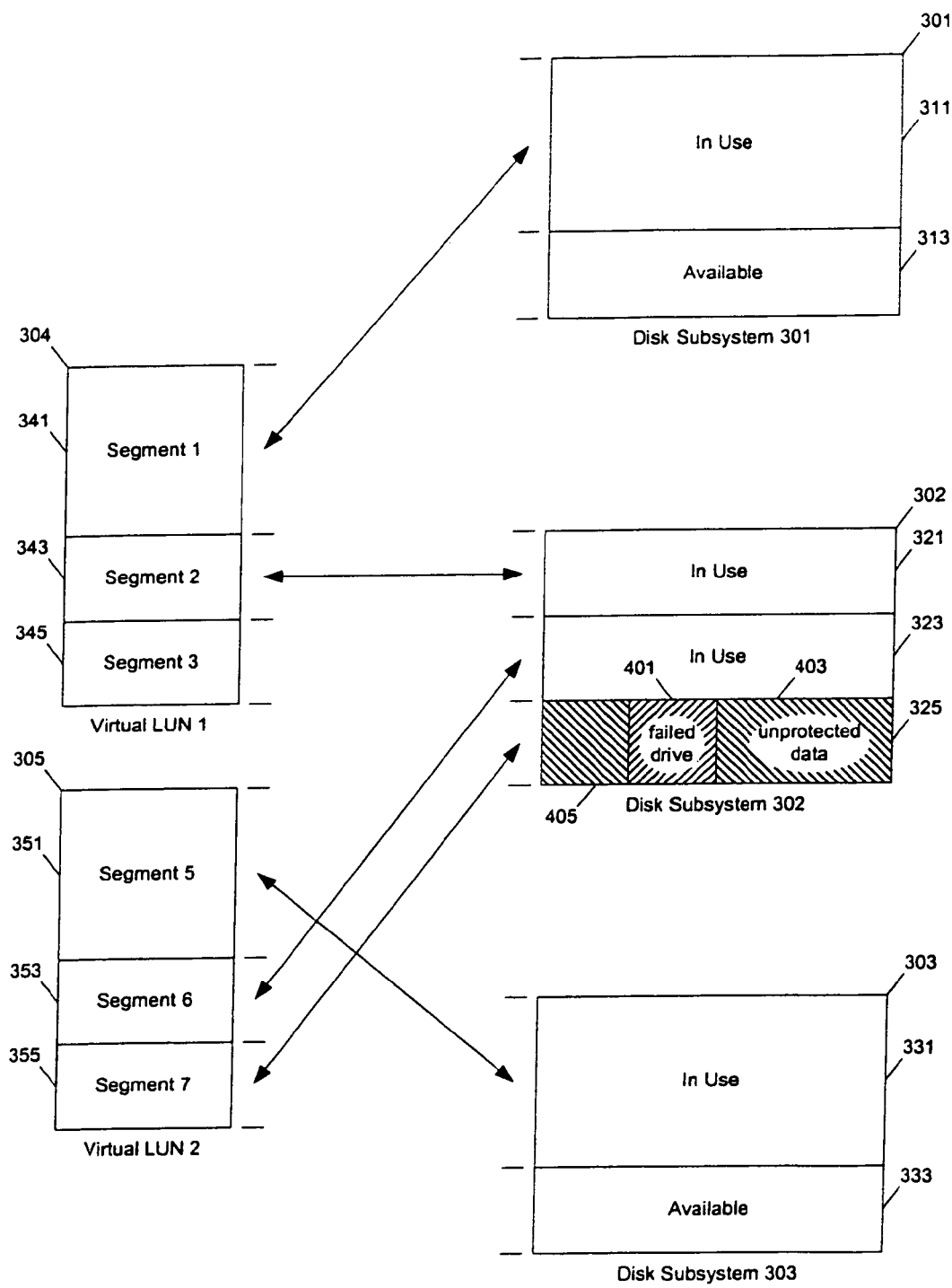
Figure 5:
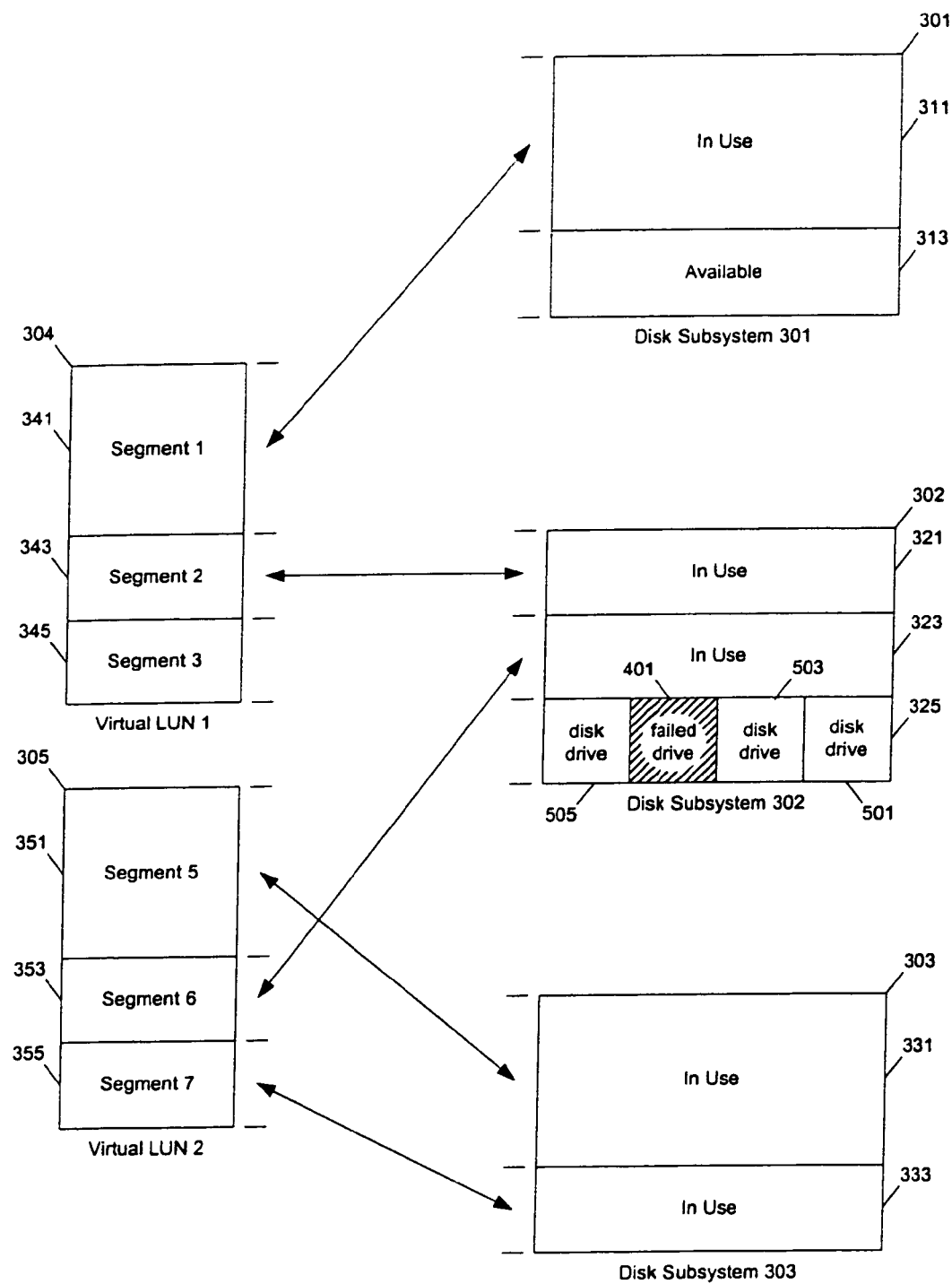

FIGS. 3–5 illustrate an example scenario to restore data redundancy according to one embodiment of the present invention. FIG. 3 shows that the logical addresses for virtual devices 304 and 305 are mapped to physical addresses for disk subsystems 301, 302 and 303. Data for virtual device 304 at segments 341 and 343 are respectively stored at segment 311 of subsystem 301 and segment 321 of subsystem 302; and data for virtual device 305 at segments 351, 353 and 355 respectively are stored at segment 331 of subsystem 303 and segments 323 and 325 of subsystem 302. Segment 345 on virtual device 304 is not used; and segment 313 on subsystem 301 and segment 333 on subsystem 303 are available. It is understood that a segment on a disk subsystem may occupy the entire space of a disk array or only a portion of the space of the disk array.

If a disk drive in a subsystem fails, a portion of the data on the subsystem no longer has redundancy. If there is a hot spare on the subsystem, the hot spare can be used by the subsystem to recover the data on the failed drive and regain redundancy. However, if no hot spare is available on the subsystem, the available spaces in the other subsystem can be used to restore redundancy.

FIG. 4 shows a scenario where a drive failed so that the data on segment 325 in subsystem 302 no longer has redundancy. There is no hot spare available on subsystem 302. Since data 401 on the failed drive is inaccessible, data 403 and 405 on the remaining drives on the array is no longer protected by redundancy. Typically, when a RAID system loses data redundancy due to a failed drive, the RAID system enters a mode in which the performance for data access is degraded. RAID disk controllers typically receive signals from the drives (or fail to receive acknowledge signals from the drive) which indicate a failed drive. These signals are used by the various implementations described herein to detect the loss of redundancy. Since data for segment 355 on virtual device 305 is physically stored on segment 325, which loses data redundancy, the access to the data on segment 355 on the virtual device is in a degraded mode. To protect the data on segment 355 and restore data redundancy, the data on segment 325 can be read from the RAID system running in the degraded mode and copied to the available spaces in other RAID systems that are functioning in a normal mode, such as in segments 313 and 333. When the data on segment 325 is copied to one or more other storage units running in the normal mode, the storage virtualization engine can remap the logic addresses for segment 355 to the new locations of the data in the storage units running in the normal mode so that the data for segment 355 are protected by redundancy and the access to these data are restored to the normal mode.

FIG. 5 shows a scenario where data on segment 325 is copied to segment 333. After the data is copied to segment 333, the data can be accessed in the normal mode from subsystem 303; and the storage virtualization engine is reconfigured to map the logical addresses for segment 355 on virtual device 305 to the physical addresses for segment 333 on storage subsystem 303. The disk drives 501, 503 and 505 can be freed as hot spares for subsystem 302 and as spare disks for the data center. Since the data on segment 355 on the virtual device, which was affected by the failed drive, is fully recovered with redundancy to function in the normal mode, the failed drive can be replaced whenever convenient. Alternatively, failed drives need not be replaced; and more subsystems can be added to provide more available spaces for the storage virtualization engine to expand virtual devices and to host data affected by failed drives.

Although FIGS. 3–5 show a scenario where the disk array affected by a failed drive corresponds to one segment on a virtual device, the data for the affected disk array may correspond to one or more segments on one or more virtual devices. The data for the affected disk array may be copied to one or more other subsystems or other disk arrays on the same subsystem. A policy may be set to determine a best way to relocate the data on the affected disk array and remap the logical and physical addresses. When the data center does not have enough available spaces to host the entire data affected by the failed drive, a portion of the affected data may be moved and remapped to the available spaces so that at least a portion of the affected data is protected. Further, the process of copying and remapping can be performed in a progressive fashion in which, after a portion of the affected data is copied and remapped, another portion of the affected data is copied and remapped until all affected data is copied and remapped. For example, the data from segment 325 may be copied and remapped one stripe after another until all data in segment 325 are moved to segment 333 to achieve the result of FIG. 5. When data is moved progressively from a degraded array to a normal fully redundant array, only the portion of the data that is currently being moved needs to be synchronized (or locked for the purpose of synchronization) in case write operations are performed on the affected data.

Figure 6:
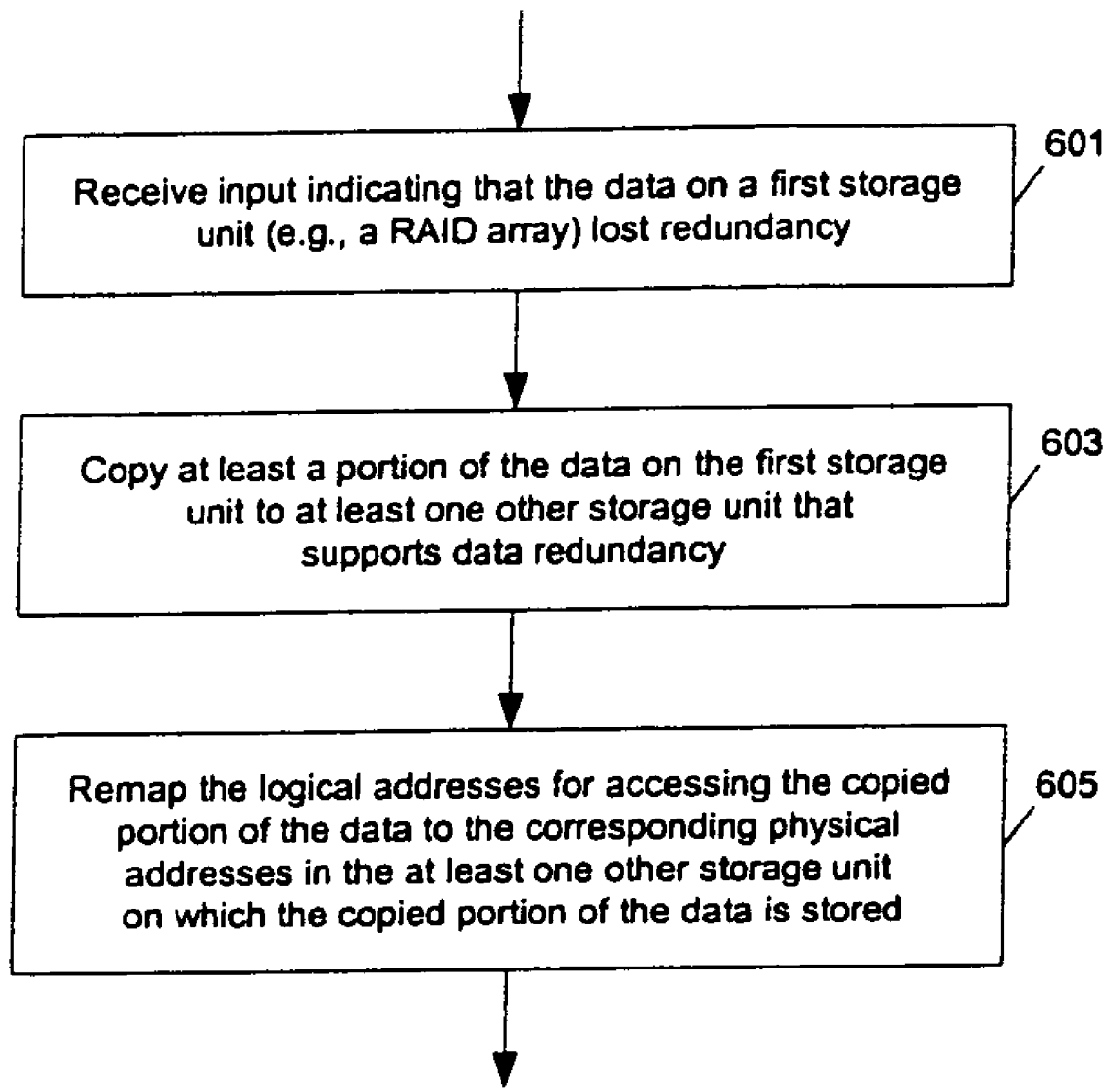
FIG. 6 shows a flow chart of a method to restore data redundancy according to one embodiment of the present invention.

FIG. 6 shows a flow chart of a method to restore data redundancy according to one embodiment of the present invention. After operation 601 receives input (e.g., a failure signal from a disk drive or a lack of an acknowledge signal from the drive after a period of time) indicating that the data on a first storage unit (e.g., a RAID array) lost redundancy, operation 603 copies at least a portion of the data on the first storage unit to at least one other storage unit that supports data redundancy; and operation 605 remaps the logical addresses for accessing the copied portion of the data to the corresponding physical addresses in the at least one other storage unit on which the copied portion of the data is stored. It is understood that when the data is copied from the first storage unit, the first storage unit automatically reconstructs the data stored on the failed media (e.g., a disk drive) from the corresponding parity data (e.g., in the degrade mode for reading operations).

Figure 7:
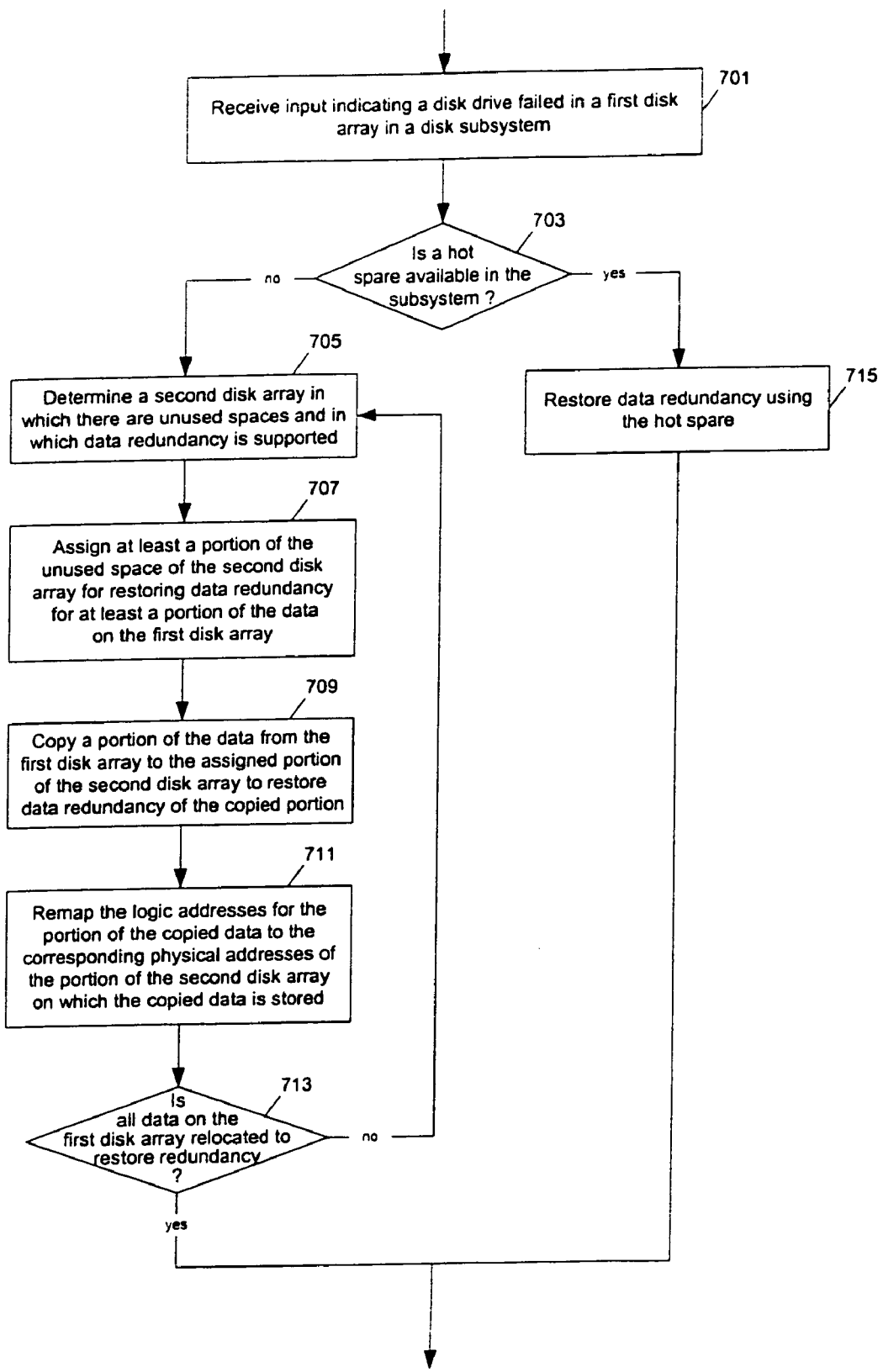
FIG. 7 shows a detailed flow chart of a method to restore data redundancy according to one embodiment of the present invention.

FIG. 7 shows a detailed flow chart of a method to restore data redundancy according to one embodiment of the present invention. After operation 701 receives input (e.g., a failure signal from a disk drive or a lack of an acknowledge signal from the drive after a period of time) indicating that a disk drive failed in a first disk array in a disk subsystem, operation 703 determines whether or not a hot spare is available in the subsystem. If a hot spare is available, operation 715 restores data redundancy using the hot spare; otherwise, operation 705 determines a second disk array in which there are unused spaces and in which data redundancy is supported. The second disk array may be entirely unused by virtual devices on a storage virtualization engine, or partially unused by the virtual devices on the storage virtualization engine. Operation 707 assigns at least a portion of the unused space of the second disk array for restoring data redundancy for at least a portion of the data on the first disk array. Operation 709 copies a portion of the data from the first disk array to the assigned portion of the second disk array to restore data redundancy for the copied portion of the data. Operation 711 remaps the logical addresses for the portion of the copied data to the corresponding physical addresses of the portion of the second disk array on which the copied data is stored. Operations 705–711 can be repeated to relocate portions of the data from the first disk array to another disk array (or the second disk array) until operation 713 determines that all data on the first disk array is relocated to restore redundancy.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to restore data redundancy, the method comprising:
   receiving input indicating loss of redundancy for first data and second data on a first storage unit;
   copying the first data from the first storage unit to a second storage unit, the first data stored on the second storage unit having redundancy;
   copying the second data from the first storage unit to a third storage unit, the second data stored on the third storage unit having redundancy;
   mapping logical addresses for accessing the second data to physical addresses for the third storage unit in which the second data is stored; and
   mapping logical addresses for accessing the first data to physical addresses for the second storage unit in which the first data is stored, wherein said second data is not copied to said second storage unit in response to said input.

2. A method as in claim 1 further comprising:
   determining a portion of the second storage unit;
   wherein the first data is copied onto the portion of the second storage unit.

3. A method as in claim 1 wherein both the first and second storage units are in a storage subsystem under control of a storage controller.

4. A method to restore data redundancy, the method comprising:
   receiving input indicating loss of redundancy for first data and second data on a first storage unit;
   copying the first data from the first storage unit to a second storage unit, the first data stored on the second storage unit having redundancy;
   copying the second data from the first storage unit to a third storage unit, the second data stored on the third storage unit having redundancy;
   configuring a storage virtualization engine to map logical addresses for accessing the first data to physical addresses for the second storage unit in which the first data is stored; and
   configuring the storage virtualization engine to map logical addresses for accessing the second data to physical addresses for the third storage unit in which the second data is stored, wherein said second data is not copied to said second storage unit in response to said input.

5. A method as in claim 4 further comprising:
   determining a portion of the second storage unit;
   wherein the first data is copied onto the portion of the second storage unit.

6. A method as in claim 4 wherein both the first and second storage units are in a storage subsystem under control of a storage controller.

7. A tangible machine readable medium containing executable computer program instructions which when executed by a digital processing system cause said system to perform a method to restore data redundancy, the method comprising:
   receiving input indicating loss of redundancy for first data and second data on a first storage unit;
   copying the first data from the first storage unit to a second storage unit, the first data stored on the second storage unit having redundancy;
   copying the second data from the first storage unit to a third storage unit, the second data stored on the third storage unit having redundancy;
   mapping logical addresses for accessing the first data to physical addresses for the second storage unit in which the first data is stored; and
   mapping logical addresses for accessing the second data to physical addresses for the third storage unit in which the second data is stored, wherein said second data is not copied to said second storage unit in response to said input.

8. A medium as in claim 7 wherein the method further comprises:
   determining a portion of the second storage unit;
   wherein the first data is copied onto the portion of the second storage unit.

9. A medium as in claim 7 wherein both the first and second storage units are in a storage subsystem under control of a storage controller.

10. A tangible machine readable medium containing executable computer program instructions which when executed by a digital processing system cause said system to perform a method to restore data redundancy, the method comprising:
   receiving input indicating loss of redundancy for first data and second data on a first storage unit;
   copying the first data from the first storage unit to a second storage unit, the first data stored on the second storage unit having redundancy;
   copying the second data from the first storage unit to a third storage unit, the second data stored on the third storage unit having redundancy;

configuring a storage virtualization engine to map logical addresses for accessing the first data to physical addresses for the second storage unit in which the first data is stored; and configuring the storage virtualization engine to map logical addresses for accessing the second data to physical addresses for the third storage unit in which the second data is stored, wherein said second data is not copied to said second storage unit in response to said input.

11. A medium as in claim 10 wherein the method further comprises:

determining a portion of the second storage unit;

wherein the first data is copied onto the portion of the second storage unit.

12. A medium as in claim 10 wherein both the first and second storage units are in a storage subsystem under control of a storage controller.

13. A digital processing system to restore data redundancy, the digital processing system comprising:

means for receiving input indicating loss of redundancy for first data and second data on a first storage unit;

means for copying the first data from the first storage unit to a second storage unit, the first data stored on the second storage unit having redundancy;

means for copying the second data from the first storage unit to a third storage unit, the second data stored on the third storage unit having redundancy;

means for mapping logical addresses for accessing the first data to physical addresses for the second storage unit in which the first data is stored; and means for mapping logical addresses for accessing the second data to physical addresses for the third storage unit in which the second data is stored, wherein said second data is not copied to said second storage unit in response to said input.

14. A digital processing system as in claim 13 further comprising:

means for determining a portion of the second storage unit;

wherein the first data is copied onto the portion of the second storage unit.

15. A digital processing system as in claim 13 wherein both the first and second storage units are in a storage subsystem under control of a storage controller.

16. A digital processing system to restore data redundancy, the digital processing system comprising:

means for receiving input indicating loss of redundancy for first data and second data on a first storage unit;

means for copying the first data from the first storage unit to a second storage unit, the first data stored on the second storage unit having redundancy;

means for copying the second data from the first storage unit to a third storage unit, the second data stored on the third storage unit having redundancy;

means for configuring a storage virtualization engine to map logical addresses for accessing the first data to physical addresses for the second storage unit in which the first data is stored; and means for configuring the storage virtualization engine to map logical addresses for accessing the second data to physical addresses for the third storage unit in which the second data is stored, wherein said second data is not copied to said second storage unit in response to said input.

17. A digital processing system as in claim 16 further comprising:

means for determining a portion of the second storage unit;

wherein the first data is copied onto the portion of the second storage unit.

18. A digital processing system as in claim 16 wherein both the first and second storage units are in a storage subsystem under control of a storage controller.

* * * * *